Patented Apr. 29, 1941

2,240,341

UNITED STATES PATENT OFFICE 2,240,341

AZO DYESTUFFS

Henry Mirocourt, Sotteville - les - Rouen, and Marcel Georges Jirou, Rouen, France, assignors to Compagnie Nationale de Matieres Colorantes et Manufactures de Produits Chimiques du Nord Reunies, Etablissements Kuhlmann, Paris, France, a corporation of France No Drawing. Application July 17, 1937, Serial No. 154,196. In France July 23, 1936

4 Claims. (Cl. 260—163)

This invention relates to new aromatic amines, dyestuffs obtained by means of these amines, process for the manufacture of these products.

It has been found according to the present invention that by condensing hydroaromatic amines, such as cyclohexylamine and the N-alkyl-cyclohexylamines for example, with the chlorides of nitro-aromatic acids and reducing the condensation products thus formed there are obtained hitherto unknown aromatic amines of the general formula:

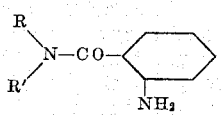

in which R represents a hydroaromatic radicle, R' a hydrogen atom or an alkyl group and in which the benzene nucleus can contain in addition to the —NH$_2$— group other substituents such as an atom of chlorine or a CH$_3$-group.

It has likewise been found that by coupling the diazo-compounds of these aromatic amines with the customary coupling components containing one or more sulphonic groups, there are obtained new acid mono-azo dyestuffs which are distinguished by a very great brightness in the tone of their shades and possess in addition a very good evenness and fastness to washing, carbonising, perspiration, sulphur, alkali lyes and light which are quite remarkable.

The coupling components particularly useful for carrying out the present invention are the α- or β-naphthol-mono- or poly-sulphonic acids, the amino-naphthol-mono- or di-sulphonic acids and also their derivatives substituted on the nitrogen, the aryl-pyrazolone sulphonic acids and their substitution products.

The following examples illustrate the invention:

Example 1

21.8 kg. of 4-aminobenzoyl-cyclohexylamine (M. P. 183° C.) obtained by condensation of cyclohexylamine with paranitro-benzoyl-chloride and reduction, are made into an emulsion in 200 litres of water containing 35 kg. of hydrochloric acid (sp. gr.=1.19) and stirred for half an hour. The suspension obtained is cooled to 0° by the addition of ice and diazotised with 7 kg. of sodium nitrite dissolved in 20 litres of water. After 2 hours the diazo compound is poured into a bath containing 31.7 kgs. of 1-(2'-chloro-5'-sulphophenyl)-3-methyl-5-pyrazolone dissolved in 250 litres of cold water with 15 kgs. of caustic soda of 35° Bé. During the addition of the diazo compound 25 kgs. of Solvay soda are added in such a manner as to maintain an alkaline reaction in the coupling medium. After 6 hours the dyestuff is filtered, pressed and dried.

In this condition the dyestuff obtained constitutes a deep yellow powder of good solubility in cold water; the solution is not changed by the addition of hydrochloric acid or dilute soda.

The dyestuff dissolves with a pure yellow colour in concentrated sulphuric acid.

It dyes wool and natural silk from an acid bath in full yellow shades of the same intensity, possessing the fastness properties set forth above.

Cotton and acetate artificial silk are very well reserved.

If in this example the 4-aminobenzoyl-cyclohexylamine is replaced by 3-aminobenzoyl-cyclohexylamine (M. P. 146° C.) obtained by condensation of metanitro-benzoyl-chloride with cyclohexylamine and reduction there is obtained a dyestuff of greenish-yellow shade of similar properties.

Instead of the 1-(2'-chloro-5'-sulphonphenyl)-3-methyl-5-pyrazolone it is possible to employ othe pyrazolones such as:

1-(4'-methyl-2'-sulphophenyl)-3-methyl - 5 - pyrazolone 1-(2'-chloro-4'sulphophenyl)-3-methyl-5- pyrazolone 1-(4'-chloro-2'-sulphophenyl)-3- methyl - 5 - pyrazolone 1-(2'-5'-chloro-4'-sulphophenyl)-3-methyl-5-pyrazolone and also the corresponding carboxyl derivatives and their esters.

Example 2

21.8 kgs. of 4-aminobenzoyl-cyclohexylamine are diazotised as in example 1 and the diazo component coupled with a solution alkaline with sodium carbonate of 24.6 kgs. of the sodium salt of 2-hydroxy-naphthalene-8-sulphonic acid.

The dyestuff produced is separated by the customary methods by salting out, filtration and drying.

In this condition it constitutes a brick red powder dissolving in water with an orange yellow colour. The solution in concentrated sulphuric acid is orange red.

It dyes wool from an acid bath a bright orange shade which is very fast to light.

It possesses a good levelling power and reserves perfectly well mercerised cotton bleached and ordinary and viscose and acetate artificial silk.

If instead of 2-hydroxy-naphthalene-8-sulphonic acid there is used 2-hydroxy-napthalene-6-sulphonic acid a dyestuff is obtained of similar properties.

*Example 3*

If in Example 2 the 2-hydroxy-naphthalene-8-sulphonic acid is replaced by 30.3 kgs. of the sodium salt of 2-acetyl-amino-8-hydroxy-naphthalene-6-sulphonic acid there is obtained a dyestuff dyeing wool from an acid bath in a yellowish-red shade of good levelling power and good fastness to light; cotton and viscose are slightly dyed, acetate artificial silk well reserved.

What we claim is:

1. Acid mono dyestuffs, of yellow, orange, and red shades, having the general formula:

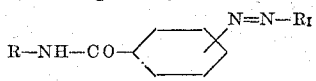

in which R represents a radicle of the cyclohexane series and $R_I$ stands for a member of the group consisting of the naphtol monosulfonic acids, naphtol polysulfonic acids, acylaminonaphtol monosulfonic acids, acylaminonaphtolpolysulfonic acids, and arylpyrazolonsulfonic acids, said dyestuffs having a very great brightness in the tone of their shades and possessing a good evenness and fastness to washing, carbonizing, perspiration, sulphur, alkali lyes and light.

2. Acid monodyestuffs of yellow, orange and red shades having the following general formula:

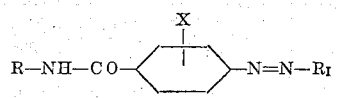

in which R represents a radicle of the cyclohexane series and $R_I$ stands for a member of the group consisting of the naphtol monosulfonic acids, naphtolpolysulfonic acids, acylaminonaphtol monosulfonic acids, acylaminonaphtol-polysulfonic acids, and arylpyrazolonsulfonic acids, X is a member of the group consisting of Cl and $CH_3$, said dyestuffs having a very great brightness in the tone of their shades and possessing a good evenness and fastness to washing, carbonizing, perspiration, sulphur, alkali lyes and light.

3. Process for the manufacture of acid monoazodyestuffs consisting in coupling the diazo compounds of aromatic amines of the general formula:

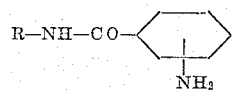

in which R represents a radicle of the cyclohexane series, with a coupling component being a member of the group consisting of the naphtol monosulfonic acids, the naphtolpolysulfonic acids, the acylamino-mono-naphtol-sulfonic acids, the acylamino-naphtol polysulfonic acids, and the arylpyrazolonsulfonic acids.

4. Process for the manufacture of acid monoazo-dyestuffs consisting in coupling the diazo compounds of aromatic amines of the general formula:

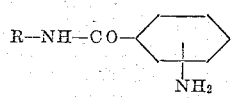

in which R represents a radicle of the cyclohexane series, and in which the benzene nucleus contains in addition to the $NH_2$ group a member of the group consisting of chlorine and methyl groups, with a coupling component being a member of the group consisting of the naphthol monosulfonic acids, the naphtol polysulfonic acids, the acyl-amino-naphthol mono-sulfonic acids, the acylaminonaphtolpolysulfonic acids, and the arylpyrazolonsulfonic acids.

HENRY MIROCOURT.
MARCEL GEORGES JIROU.